US010395298B2

(12) United States Patent
Berg (10) Patent No.: US 10,395,298 B2
(45) Date of Patent: Aug. 27, 2019

(54) METHODS, APPARATUS AND ARTICLES OF MANUFACTURE FOR A RING ADVISOR SYSTEM (71) Applicant: Electronic Commodities Exchange, L.P., New York, NY (US)

(72) Inventor: Alex Berg, Seattle, WA (US)

(73) Assignee: ELECTRONIC COMMODITIES EXCHANGE, L.P., New York, NY (US)

( * ) Notice: Subject to any disclaimer, the term of this patent is extended or adjusted under 35 U.S.C. 154(b) by 795 days.

(21) Appl. No.: 14/831,785

(22) Filed: Aug. 20, 2015

(65) Prior Publication Data
US 2016/0055569 A1 Feb. 25, 2016

Related U.S. Application Data (60) Provisional application No. 62/039,573, filed on Aug. 20, 2014.

(51) Int. Cl.
*G06Q 30/06* (2012.01)
(52) U.S. Cl.
CPC ............... *G06Q 30/0631* (2013.01)
(58) Field of Classification Search
CPC .................................. G06Q 30/0631
USPC ....................................... 705/26–27
See application file for complete search history.

(56) References Cited

U.S. PATENT DOCUMENTS

| 6,070,149 | A | 5/2000 | Tavor et al. |
| 2005/0261989 | A1* | 11/2005 | Vadon ............... G06Q 30/00 705/26.63 |
| 2008/0177639 | A1 | 7/2008 | Kuppersmith et al. |
| 2009/0037292 | A1 | 2/2009 | Panjwani |
| 2011/0145335 | A1 | 6/2011 | Muthyala et al. |
| 2011/0184831 | A1 | 7/2011 | Dalgleish |

(Continued)

FOREIGN PATENT DOCUMENTS

| CN | 107004216 | 8/2017 |
| EP | 3183705 | 6/2017 |

OTHER PUBLICATIONS

Ritani unveils new E-commerce website. (2012). Wireless News. Retrieved from https://dialog.proquest.com/professional/docview/1115645519?accountid=142257 (Year: 2012).*

(Continued)

*Primary Examiner* — Michael Misiaszek
*Assistant Examiner* — Latasha D Ramphal (57) ABSTRACT

A device that automates a design of an engagement ring. The handheld device comprises a display for displaying a series of questions to a customer and an input device that is capable of receiving at least one answer to the series of questions. The device also includes a microprocessor; and a memory that stores instructions, which cause the microprocessor to: input the at least one answer into an algorithm; identify on behalf of the customer a plurality of engagement rings that best matches the at least one answer; generate an information box in the display, in response to the selection of a specific engagement ring from the plurality of engagement rings; receive the customer's feedback on the specific engagement ring; and generating a recommended engagement ring to the customer.

15 Claims, 10 Drawing Sheets (56) References Cited

U.S. PATENT DOCUMENTS

2011/0307349 A1* 12/2011 Gandhi .............. G06Q 30/0603
                                                    705/26.5
2013/0204736 A1    8/2013  Klein
2013/0218714 A1    8/2013  Watkins et al.

OTHER PUBLICATIONS

Rule 161 Communication for EP Application No. 15833203.1; dated Mar. 28, 2017; 2 pages.
PCT Notification Concerning Transmittal of Int'l Preliminary Report on Patentability; dated Mar. 2, 2017; 6 pages.
European Extended Search Report for Application No. 15833203.1; dated Dec. 1, 2017; 8 pages.
Communication pursuant to Article 94(3) EPC for EP Application No. 15833203.1; dated Jul. 19, 2018; 8 pages.
PCT Notification Concerning Transmittal of Int'l Preliminary Report on Patentability and Written Opinion; dated Nov. 12, 2015; 13 pages.

* cited by examiner

Free FedEx Overnight Shipping
30-Day Returns

®RITANI™   🔍 Find a Jeweler   My Account ♥   Cart ♥
1.888.9RITANI   🔍

DIAMONDS   ENGAGEMENT RINGS   WEDDING   JEWELRY   GIFTS   EDUCATION

ENGAGEMENT RING ADVISOR

[ budget ] ——— [ style ] ——— [ diamond shape ] ——— [ diamond characteristics ] ——— [ Your Ring ]

Help us recommend a diamond by telling us what's important to you using the sliders below.

1. Which is more important to you - the diamond's sparkle, or its size?

Sparkle ├─────┼─────┼─────┼─────┤ Size

*Why we ask*

2. Should your diamond be flawless under magnification (very rare) or look clean to the unaided eye?

Clean under magnification ├─────┼─────┼─────┼─────┤ Clean to unaided eye

*Why we ask*

3. Should your diamond be entirely colorless (very rare), or simply colorless to the untrained eye?

No color at all ├─────┼─────┼─────┼─────┤ A small amount of color is ok

*Why we ask*

[ NEXT ]
show me my recommendations

*Want to fully customize your ring from thousands of combinations instead? Create your own ring now.*

Free FedEx Overnight Shipping
30-Day Returns

⊕ RITANI™

🔍 Find a Jeweler   My Account ▼   Cart ▼
1.888.9RITANI

DIAMONDS   ENGAGEMENT RINGS   WEDDING   JEWELRY   GIFTS   EDUCATION   🔍

ENGAGEMENT RING ADVISOR budget — style — diamond shape — diamond characteristics — Your Ring Choose from 1 of 5 recommended rings > *Why did we recommend this ring?*

CHANGE MY DIAMOND                                                                 CLOSE (X)

Tell us what you like and don't like about this diamond and we'll suggest alternatives.

Improve my diamond's [select one ▼] but do not change its [select one ▼]

[ RECOMMEND A NEW DIAMOND ]

*(For example, if you want a larger diamond for the same price we'll downgrade the color and clarity slightly.)*

...led Engagement Ring
Color, VS2 Clarity
...nd
(1 review)
234

$6,134
▬▬▬▬▬ 4.5 (7 reviews)

[ NEXT ]
Preview your ring free at a retailer or buy it now

...thedral Engagement
...arat, D Color, VS2
...iamond
5.0 (2 reviews)
$6,134

RITANI™

Free FedEx Overnight Shipping
30-Day Returns

Find a Jeweler    My Account ▼    Cart ▼
1.888.9RITANI

DIAMONDS    ENGAGEMENT RINGS    WEDDING    JEWELRY    GIFTS    EDUCATION

DIAMOND ADVISOR EXPLORER

This is a quick and dirty screen to allow us to see what the DiamondAdvisor is producing.

USER INPUT OPTIONS

These inputs represent the questions and sliders that will be presented to the user. For "Size vs. Sparkle", "Clarity boost", and "Color boost" we'll need to determine what numbers to use at each point on the sliders.

Min price    Max price    Shape
7000        7500        RD▼

Size vs. sparkle
0.5
Strong sparkle pref      No pref      Strong size pref Clarity boost
1
Don't care at all      Neutral      Strong pref Color boost
1

▲ My favorites

ALGORITHM CONFIGURATION OPTIONS
Show/hide

These inputs represent variables within the score calculation that would either be hard coded, or automatically determined based on the shape of diamond selected. These are here to allow us to explore their impact on various diamond shapes.

If you leave these inputs blank they will be set automatically based on the maximum values available for the given shape and price range.

Max weight      Max sparkle      Max rank Ritani rank boost
1
Ritani rank is weak      Ritani Rank is Neutral      Ritani Rank is Strong Go!

FIG. 10

METHODS, APPARATUS AND ARTICLES OF MANUFACTURE FOR A RING ADVISOR SYSTEM

CROSS REFERENCE TO RELATED APPLICATIONS

This application claims benefit of U.S. Provisional Patent Application No. 62/039,573, filed Aug. 20, 2014 which is hereby incorporated by reference in its entirety.

FIELD OF THE INVENTION

This application is generally related to systems and methods for selecting, educating and demystifying the selection of a diamond and other jewelry items.

DETAILED DESCRIPTION

Ring Wizard

For some individuals, the purchase of an engagement ring is their first introduction to diamonds and therefore they know little to nothing about diamonds. Furthermore, these individuals often do not have the time or inclination to learn all the intricacies about diamonds. FIGS. 1-10 illustrate a system that provides a wizard-like experience wherein customers are asked step-by-step questions about what they want in a ring, such as a desired setting and desired type of diamond, helps streamline and demystify the diamond buying process for these individuals. Such an experience is largely devoid of jargon. In some embodiments, the system also may educate the buyer along the process.

In one embodiment, trend data on what other buyers might purchase in similar situation is also provided. In one embodiment, the trend data may be filtered according to one or more characteristics. For example, a buyer may wish to filter the trend data is accordance to individuals in a share age category. In another embodiment, the buyer may wish to filter the trend data in accordance to a share income bracket. Some characteristics may include age, gender, race, geographic region, income bracket, etc.

In one embodiment, the system implements a natural language search method for finding a diamond. In one embodiment, an algorithm involves taking slider inputs from a user and traverses our inventory looking for diamonds with a score that aligns with customer inputs as well as their budget and setting choice. The slider points are represented by numbers. In one embodiment, a minimum value and a maximum value are taken. In the final implementation, a single number is accepted with an optional 'my budget is ballpark' flag that, if clicked, will make the budget fuzzy, such as around 10%.

Recommendation Engine

Customers also may take advantage of a recommendation engine that is available on the website, which searches the database of available jewelry items and suggest the best possible match(es) based on user-provided data.

In at least one embodiment, the customer selects one or more jewelry items of the same type. As discussed above, the jewelry item may include any number of types, including loose gemstones, and finished pieces. The selected jewelry items share similar intrinsic characteristics, although the values assigned to those characteristics may vary. For example, a user searching for loose diamonds may select three different stones. Each stone has specific intrinsic characteristics, such as cost, carat size, color and clarity. The system may calculate an average of the intrinsic characteristics for each stone. For example, if the three stones have a carat size of 1.8 carat, 2.3 carat and 2.5 carat, then the average of carat of these three stones would be the combination of these three carat sizes divided by three, or in other words: 2.2 carats. The same calculation may be done for the other characteristics.

In some embodiments, there is a numeric value that is assigned to each characteristic. Such as every 1 carat equals 10 points, so that a 2.2 carat stone equals 22 points. Likewise, an ideal cut may equate 50 points, whereas a Very Good Cut equals 40 points.

In at least one embodiment, the system computes an average of each characteristic based on the values of the selected stones. Then using the numeric value that is assigned to each characteristic, the system computes a score for each of the averages. A combination of the computed scores for the averages equals a total score. This total score is used as a benchmark later on, to be compared against all of the other stones in the database.

Figure 9:
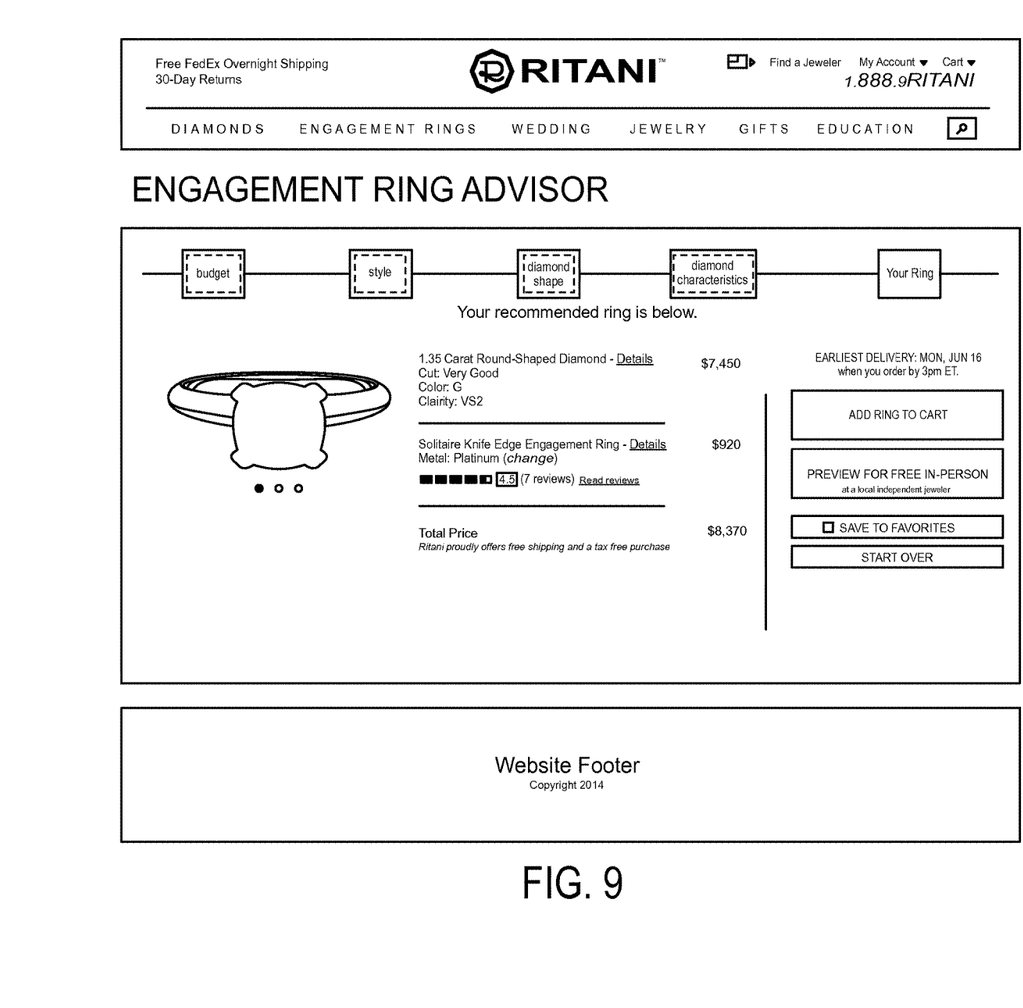
FIG. 9 depicts an exemplary user interface for providing information about a recommended product in accordance with an aspect of the invention.

After the user selects the three stones, the user may be presented with a preference tool, which attempts to gauge the user's level of preference of the various characteristics. Referring to FIG. 9, the preference tool is represented by a series of sliders 902-908. Each slider corresponds to an intrinsic characteristic. A user can slide a marker 910 between two end points: very important 912 and not important 914. By sliding marker 910 between end points 912, 914, the user indicates the level of importance that he assigns to each intrinsic characteristic.

For example, the user may value the carat size of the diamond far above the other characteristics, in which case, he may move marker 910 closer to end point 912.

In at least one embodiment, the user ranks each of the intrinsic characteristics in order from most important to least important. The user may accomplish the rankings via the sliders described above. He also may rank the intrinsic characteristics by numbering the characteristics, such as from 1-4, where the number 1 corresponds to a ranking of "most important" and the number 4 corresponds to a ranking of "least important." No two intrinsic characteristics may have the same ranking.

In another embodiment, the user clicks one of several boxes next to the intrinsic characteristic. The click may produce a check mark in the box. Each characteristic may have several boxes with labels such as very important, somewhat important, somewhat not important and not important.

In another embodiment, the user may directly input his preference into a text box located next to each characteristic. The user may input text, such as "Very Important" or "Not Important."

In yet another embodiment, the user assigning a numeric value to each intrinsic characteristics. Rather than a sequential ranking, the user rates each intrinsic characteristics on scale from 1-4, where the number 1 corresponds to a ranking of "most important" and the number 4 corresponds to a ranking of "least important." In such an instance, several intrinsic characteristics may have the same rating.

Upon receiving indication of the level of importance assigned to each intrinsic characteristic, the system may apply a corresponding multiple to the respective intrinsic characteristics. The multiplier depicts the weighting that would be assigned to each characteristic score.

For example, ratings of "Very Important", "Somewhat Important", "Somewhat No Important" and "Not Important" may be assigned a multiple value of 4, 3, 2 and 1, respectively. These multipliers are applied to its respective value. In at least one embodiment, a characteristic receiving a level of importance of a "4" may result in the system giving more weight to the score of that characteristic. For example, in one embodiment, the system may multiple the carat score by a multiplier of 4.

The system also takes into account the price of the selected jewelry items. In at least one embodiment, the prices of the selected jewelry item serves as a filter, so that the system only attempts to seek a match with jewelry items that fall within the price range. The price range may be determined in a number of ways. The system may take an average of the prices, and attempt to only match stones that are within a tolerance of that averaged price. The system also may take the highest and lowest price from the selected set, and use those as the maximum and minimum threshold. Jewelry items that fall outside of the threshold are not even considered in the next step.

Next, the system searches the database of all available jewelry items. In at least one embodiment, each available jewelry item already has a score for each of its intrinsic characteristics. The system has already eliminated any jewelry items that fall outside the desired price range. Within this smaller subset, the system then seeks to find a jewelry item with scores that most closely match the score for the ideal jewelry item. For example, in one embodiment, the system may recommend all stones with scores for each characteristic category that are 95% within the ideal scores. In another embodiment, the system sorts the stones that meet the 95% threshold and highlights the stone with the highest percentages as the recommended stone.

In other embodiments, the system also accounts for other extrinsic weighting, such as giving more weight to stone that are among their most popular or high sellers. The system also may give more weight to preferred wholesalers. In another embodiment, jewelry wholesalers may pay a premium fee, such as a monthly fee, annual fee, a commission per sale, such as 2% of every sale, etc. in order to be giving a greater weighting by the system.

Once the user is presented with recommended stone, he may have the option to select the stone for purchase. Or he may wish to pass over the recommended stone and be presented with the next best option. The user also may continue to change and refine the level of importance given to each characteristic, and in doing so, the system will automatically update in real-time the ideal stone(s) that is being presented to the user.

Features of the invention are further described with reference to FIGS. 1-10. As noted above, FIGS. 1-10 illustrate a system that provides a wizard-like experience wherein customers are asked step-by-step questions about what they want in a ring, such as a desired setting and desired type of diamond, helps streamline and demystify the diamond buying process for these individuals. For example, FIGS. 1-10 depict screen shots (e.g., of a website, program, or application) associated with the selection of product features and preferences, the recommendation of specific products to the user, and selection by the user of one or more specific products. These screen shots are shown with reference to the selection of a diamond ring, which can involve the selection (and recommendation) of both a diamond and a ring.

Figure 1:
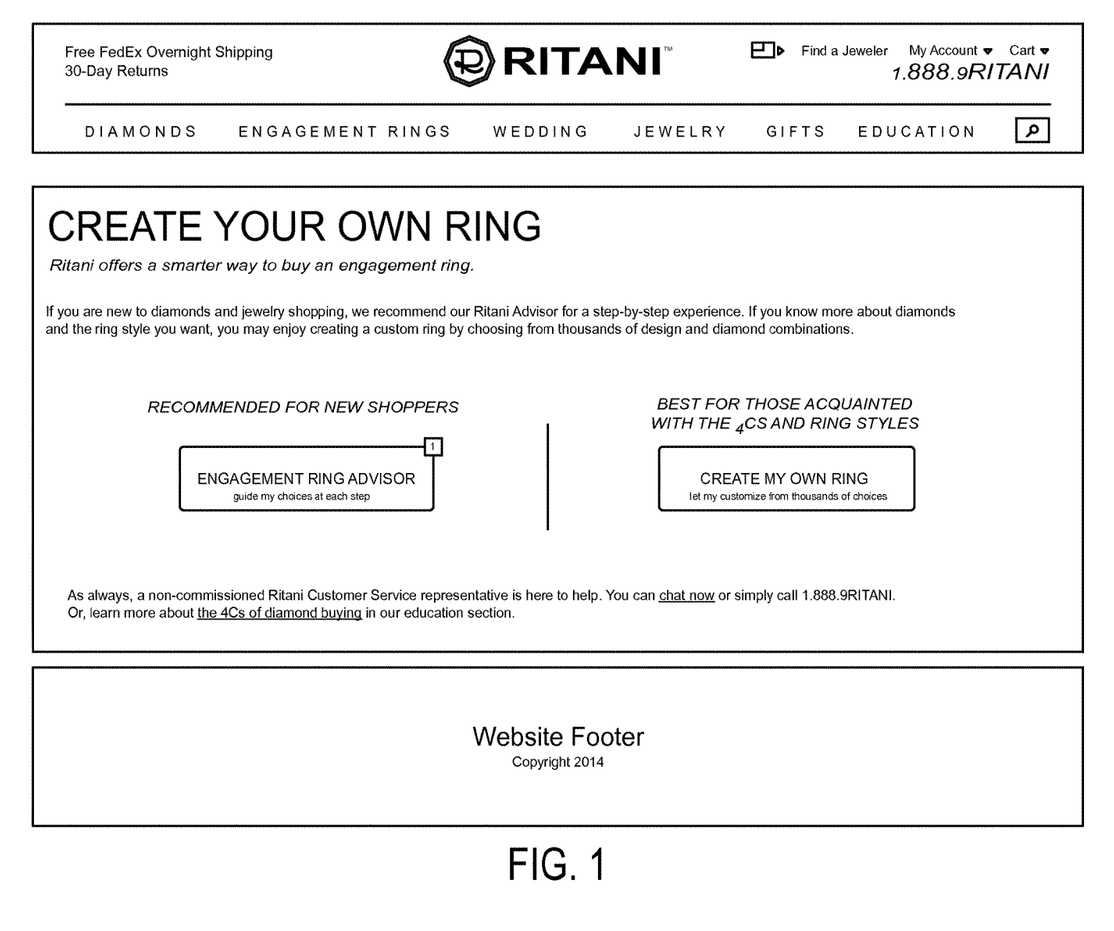
FIG. 1 depicts an exemplary user interface for use in selecting a product in accordance with an aspect of the invention.

FIG. 1 depicts an exemplary user interface for use in selecting a product in accordance with an aspect of the invention. As shown in FIG. 1, the interface of FIG. 1 prompts a user to select either an "engagement ring advisor" indicia, which may be recommended for newer shoppers, or a "create my own ring" indicia, which may be recommended for informed shoppers who are already familiar with features of the product (e.g., familiar with the "4C's" and ring styles in the case of diamonds). Selecting "engagement ring advisor" may trigger the system to provide to the user one or more of the screens depicted in FIGS. 2-9.

In some embodiments, FIGS. 1-9 may be depicted in the order presented here as part of a multi-step selection process. For example, following the prompt of FIG. 3 may cause the interface of FIG. 4 to be displayed; inputting the requested information of FIG. 4 may cause FIG. 5 to be displayed; inputting the requested information in FIG. 5 may trigger the interface of FIG. 6; and so on. However, it should be appreciated that the order may be different than that presented herein, and some interfaces may appear either before or after other interfaces. Selecting "create my own ring" may trigger one or more screens that enable a user to more directly configure ring (e.g., containing a diamond or other jewel).

Figure 2:
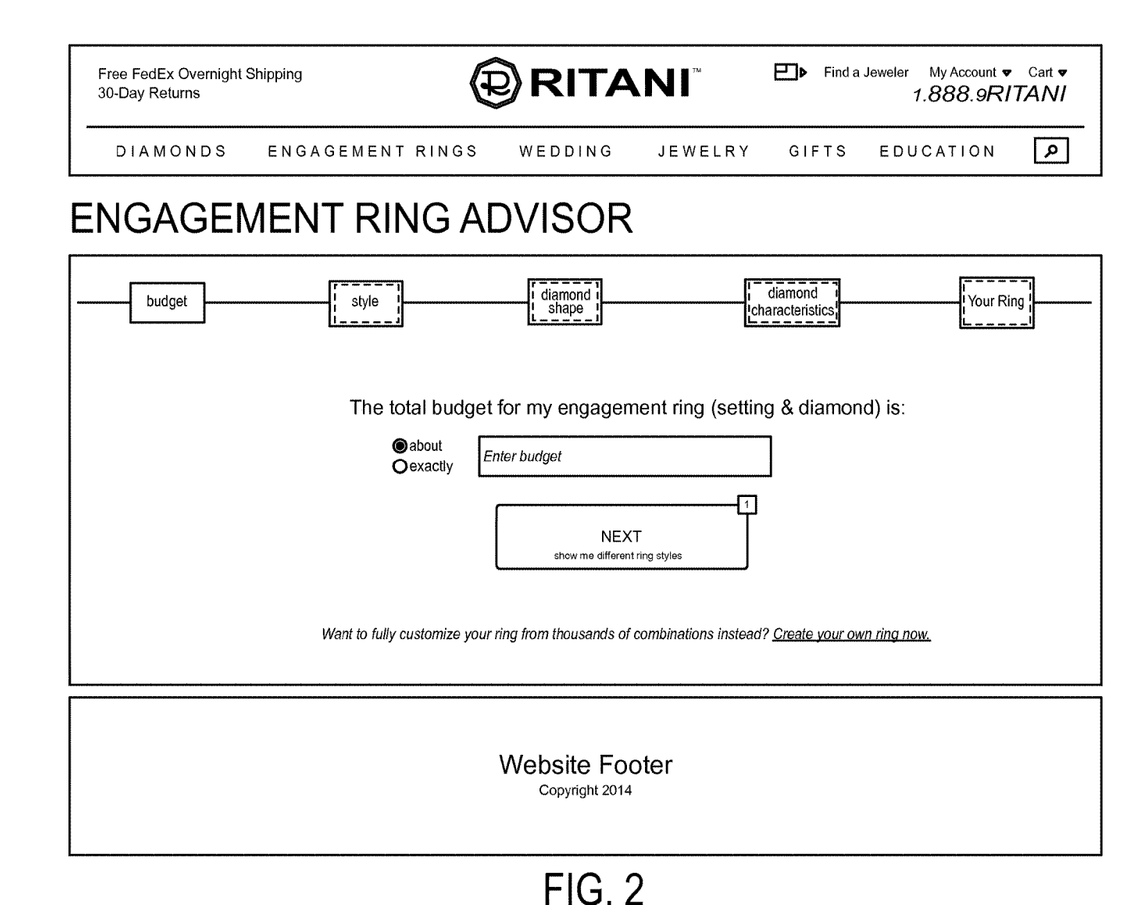
FIG. 2 depicts an exemplary user interface for use in selecting a budget for purchasing a product in accordance with an aspect of the invention.

FIG. 2 depicts an exemplary user interface for use in selecting a budget for purchasing a product in accordance with an aspect of the invention. More specifically, FIG. 2 depicts an interface that prompts a user to enter a budget for a product such as a diamond ring. The user may select with the budget is exact or approximate.

Figure 3:
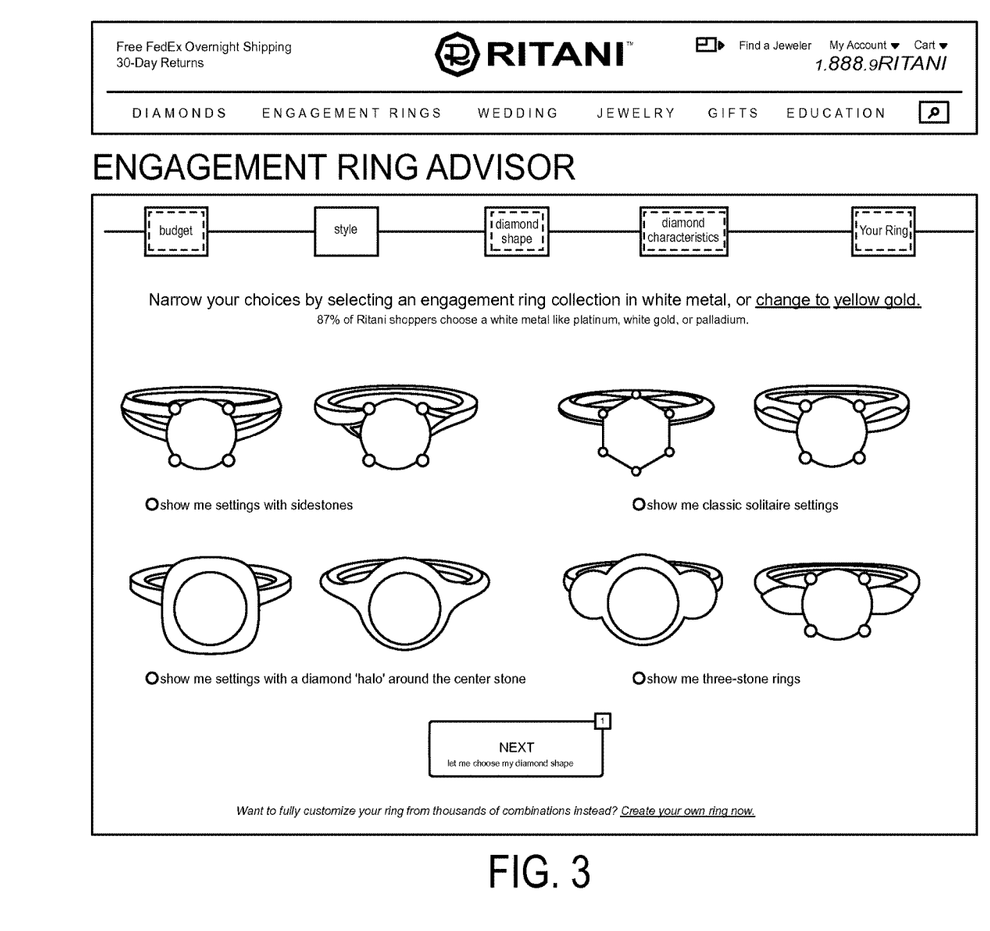
FIG. 3 depicts an exemplary user interface for selecting an attribute of a product in accordance with an aspect of the invention.

FIG. 3 depicts an exemplary user interface for selecting an attribute of a product in accordance with an aspect of the invention. More specifically, the interface of FIG. 3 prompts a user to select one (or possibly more than one) of several different ring setting types (e.g., settings with stones, solitaire settings, halo settings, and three-stone ring types). Other types may be contemplated.

Figure 4:
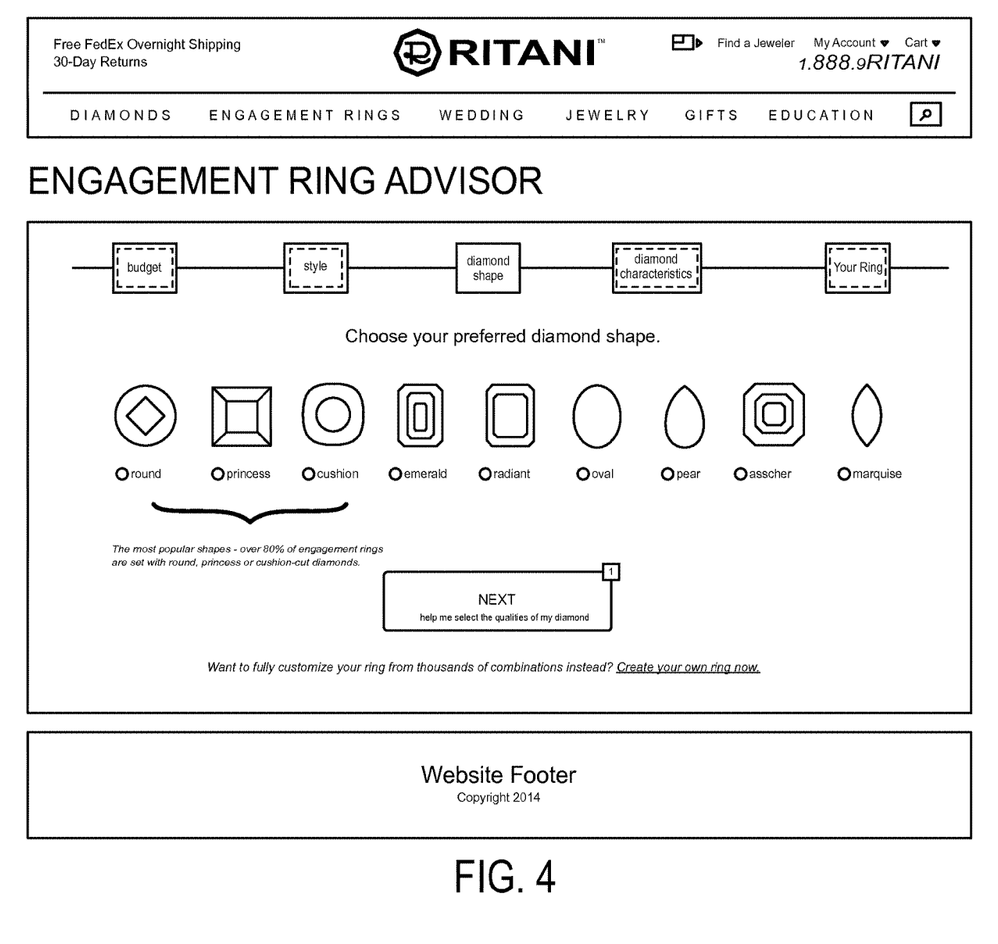
FIG. 4 depicts an exemplary user interface for selecting an attribute in accordance with an aspect of the invention.

FIG. 4 depicts an exemplary user interface for selecting an attribute in accordance with an aspect of the invention. More specifically, the interface of FIG. 4 prompts a user to select one (or more) diamond shapes, such as round, princess, cushion, emerald, radiant, oval, pear, asker, and marquise. Other shapes may also be contemplated.

Figure 5:
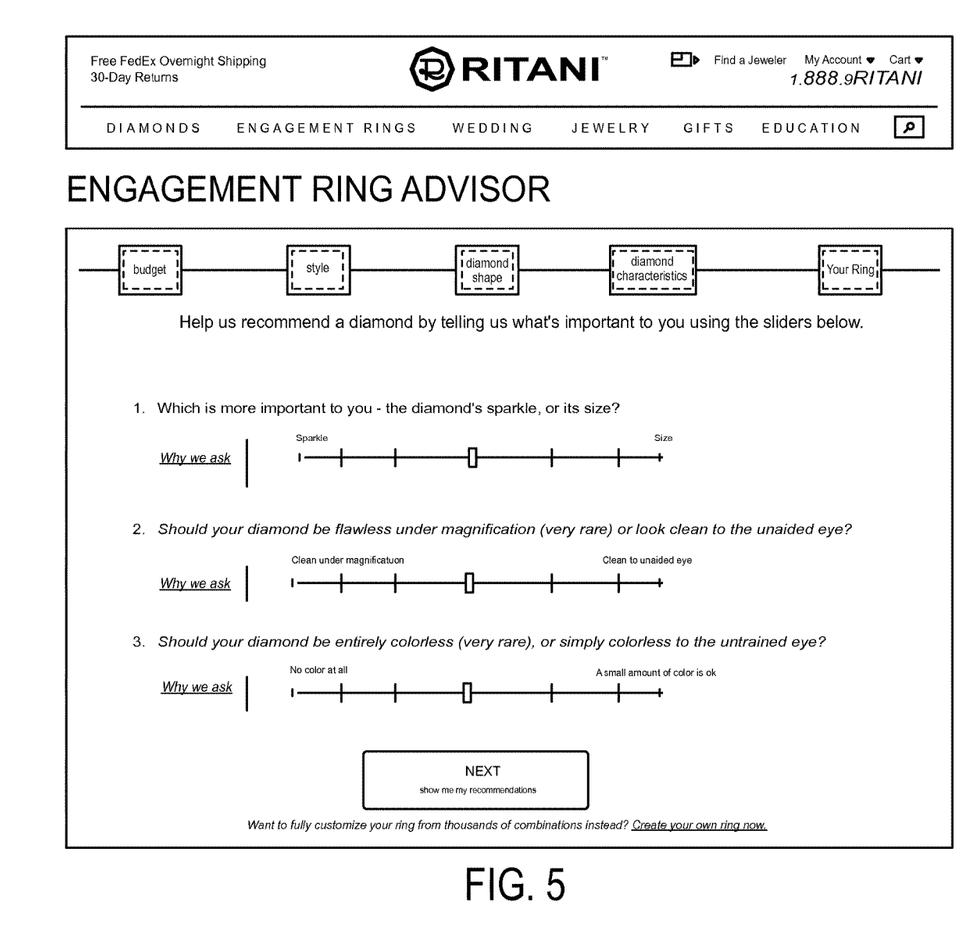
FIG. 5 depicts an exemplary user interface for selecting preferences for various attributes of a product in accordance with an aspect of the invention.

FIG. 5 depicts an exemplary user interface for selecting preferences (e.g., relative preferences) for various attributes of a product in accordance with an aspect of the invention. More specifically, the interface of FIG. 5 provides three linear "sliders" that each can be slid closer to or further from two attributes to indicate a relative preference between the two attributes. For example, a user could slide the top slider to the right to indicate the user's preference for "size" over "sparkle" of a diamond. For example, all other things being equal (e.g., comparing two diamonds having the same general shape type, color, price, and clarity), this might indicate the user would prefer a larger diamond with less sparkle over a smaller diamond with greater sparkle. Sliding the top slider two notches to the right would indicate a stronger preference for size over sparkle than moving the top slider one notch (or less than one notch) to the right. Inversely, sliding the top slider to the left would indicate the user's preference for "sparkle" over "size." Leaving the slider in a middle position (e.g., which may be the default position) may indicate that the user has no preference between the two attributes (e.g., that the user values "sparkle" and "size" equally), or may indicate that the user has not provided any information about the user's relative preferences between those two attributes.

The other two sliders in FIG. 5 enable the user to express preferences concerning clarity (e.g., by sliding a second slider between "clean under magnification" and "clean to unaided eye") and concerning color (e.g., by sliding a bottom slider between "no color at all" and "a small amount of color is ok"). Other preferences and relative preferences may be included, such as a relative preference slider between any two features of the product at issue (e.g., a slider between cut and color, cut and clarity, cut and carat, color and clarity, color and clarity, color and carat, and clarity and carat). In embodiments relating to buying cars, for example, the sliders may be between features such as gas mileage and horsepower, gas mileage and seating capacity, safety ratings and seating capacity, etc.

Figure 6:
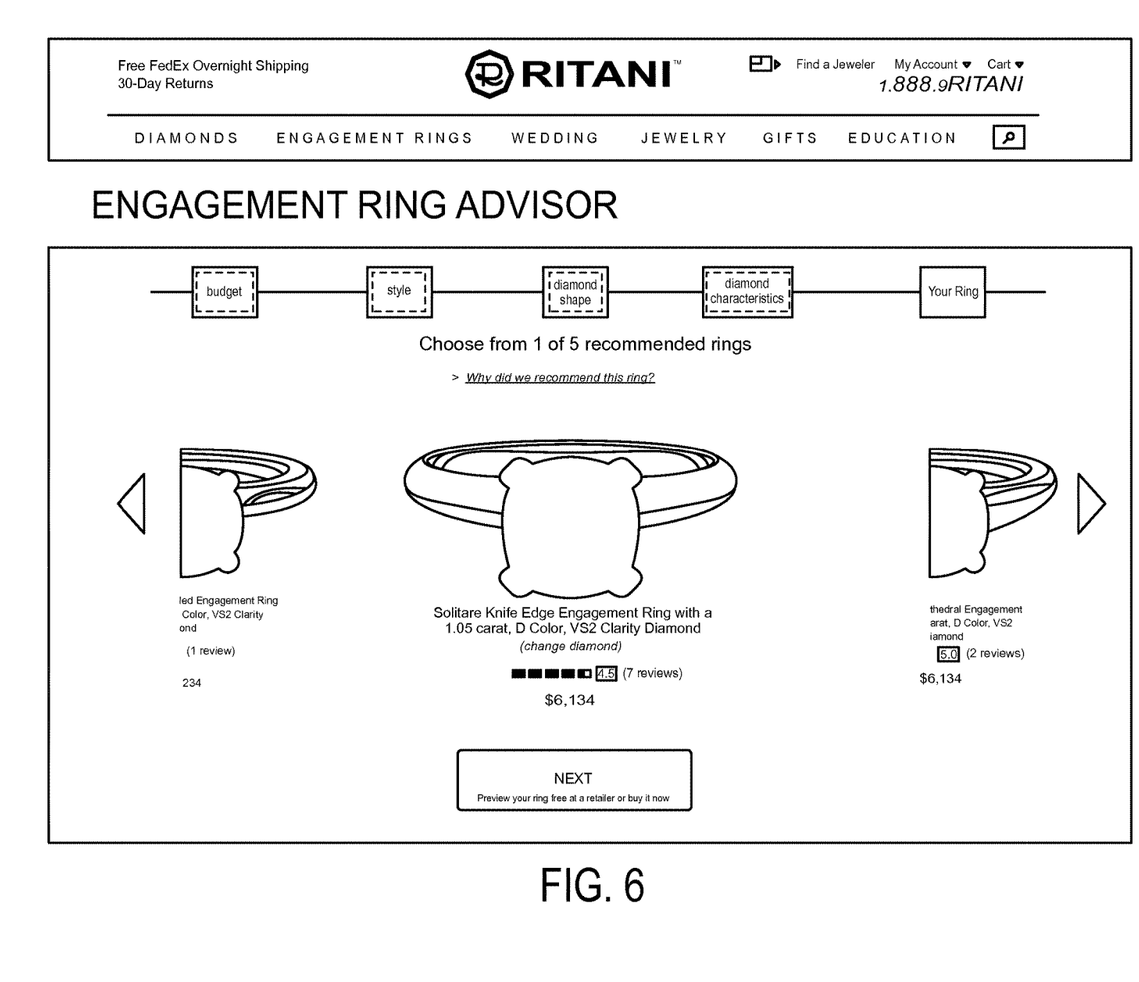
FIG. 6 depicts an exemplary user interface providing information about at least one selectable product in accordance with an aspect of the invention.

FIG. 6 depicts an exemplary user interface providing information about at least one selectable product in accordance with an aspect of the invention. More specifically, the interface of FIG. 6 depicts a plurality of diamond rings, e.g., in accordance with the user's prior inputs (e.g., regarding budget, preferences, and relative preferences). For example, the interface of FIG. 6 indicates that a user may select from five different rings, e.g., which may be recommended by the system based on the user's previously-input preferences (e.g., via the interfaces of FIGS. 1-5). In some embodiments, the interface may display a full view of one product and information related thereto (such as information about carat, color, and clarity, for example), and the user may click on the right and left arrows to see the next ring and information related thereto. In some embodiments, a user may obtain more information about a particular product or why it was recommended by selecting it (e.g., by clicking on its image).

In some embodiments, FIG. 6 may display a selectable prompt (e.g., such as a selectable link entitled "Why did we recommend this ring?") for obtaining more information about why the displayed product was recommended) that, when selected, triggers the output of information about why the specific product was recommended. For example, clicking on the ring displayed in the middle of the screen may cause the interface of FIG. 7 to be displayed.

Figure 7:
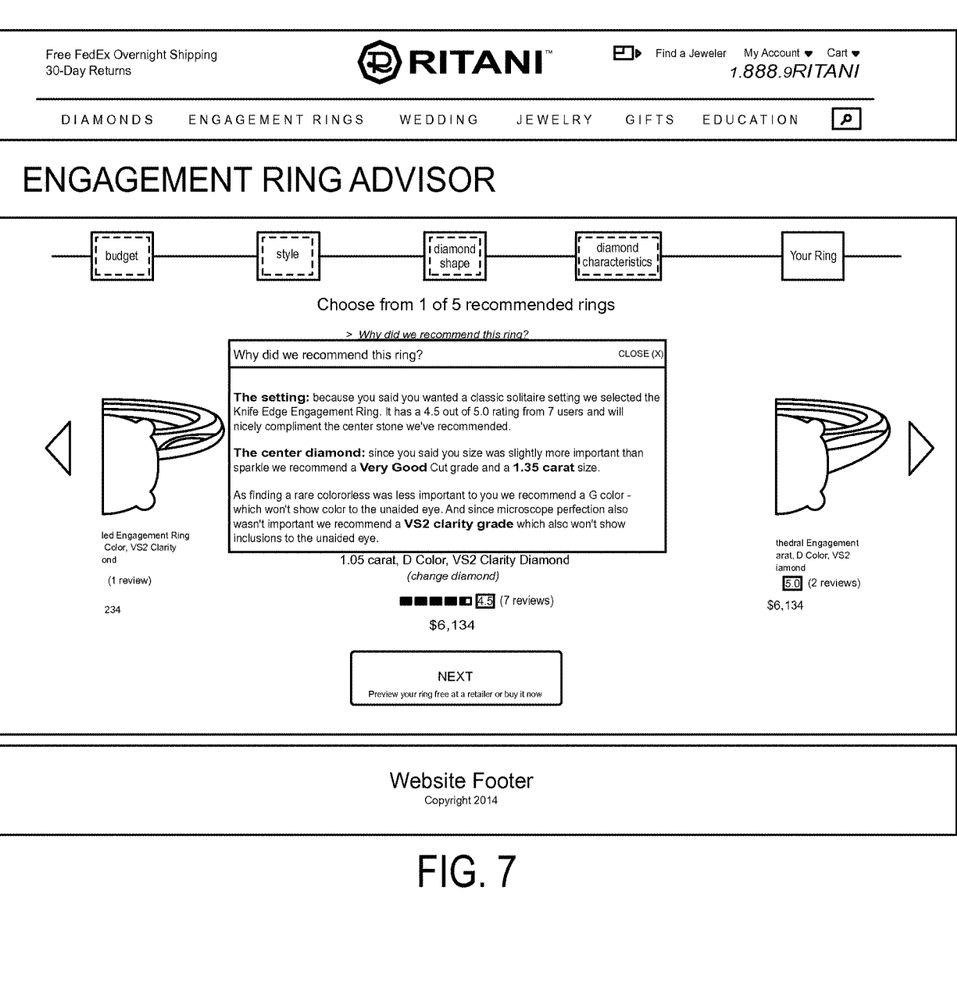
FIG. 7 depicts an exemplary user interface providing information about a selectable product in accordance with an aspect of the invention.

FIG. 7 depicts an exemplary user interface providing information about a selectable product in accordance with an aspect of the invention. For example, FIG. 7 may show information (e.g., in response to a selection of a link in FIG. 6) about why a specific product was recommended. For example, the displayed information may describe how the product at issue matches user preference information previously input (e.g., input via one or more of the interfaces of FIGS. 1-5).

Figure 8:
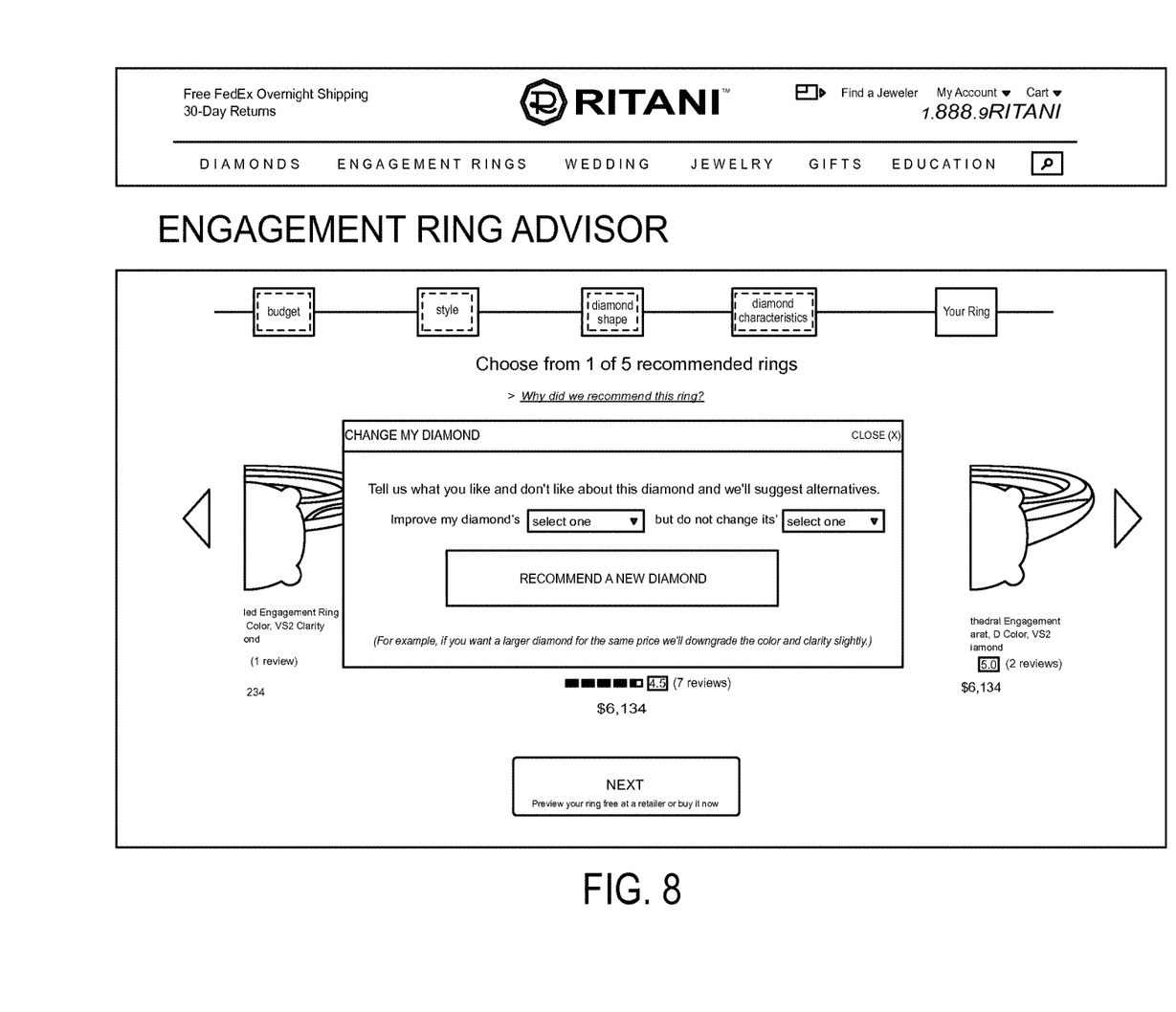
FIG. 8 depicts an exemplary user interface for inputting one or more preferences about a product in accordance with an aspect of the invention.

FIG. 8 depicts an exemplary user interface for inputting one or more preferences about a product in accordance with an aspect of the invention. For example, the interface of FIG. 8 may prompts a user to provide feedback about a specific recommended product (e.g., a specific product viewed in FIG. 6). For example, the interface of FIG. 8 may prompt the user to indicate a specific attribute of the displayed product that could be improved (e.g., one or more of color, carat, clarity, or cut of a diamond). The interface of FIG. 8 may also prompt the user to select one or more attributes of the specific product that should not be changed (or at least not downgraded). As indicated in FIG. 8, for example, if the user wants a larger diamond for the same price, the recommendation engine can find and recommend another diamond that is larger at the same price but with slightly downgraded color and clarity.

FIG. 9 depicts an exemplary user interface for providing information about a recommended product in accordance with an aspect of the invention. More specifically, the interface of FIG. 9 displays a specific recommended ring. This ring may be one of the products recommended in another interface, such as in FIG. 6, and may be a result of revised preferences, e.g., input via the interface of FIG. 8. The interface may prompt the user to select one or more of the following: add the product to shopping cart; request to preview the product for free in-person, e.g., at a local independent jeweler; save the product to a favorites folder; and/or start over (e.g., return to another interface such as that of FIG. 1).

Figure 10:
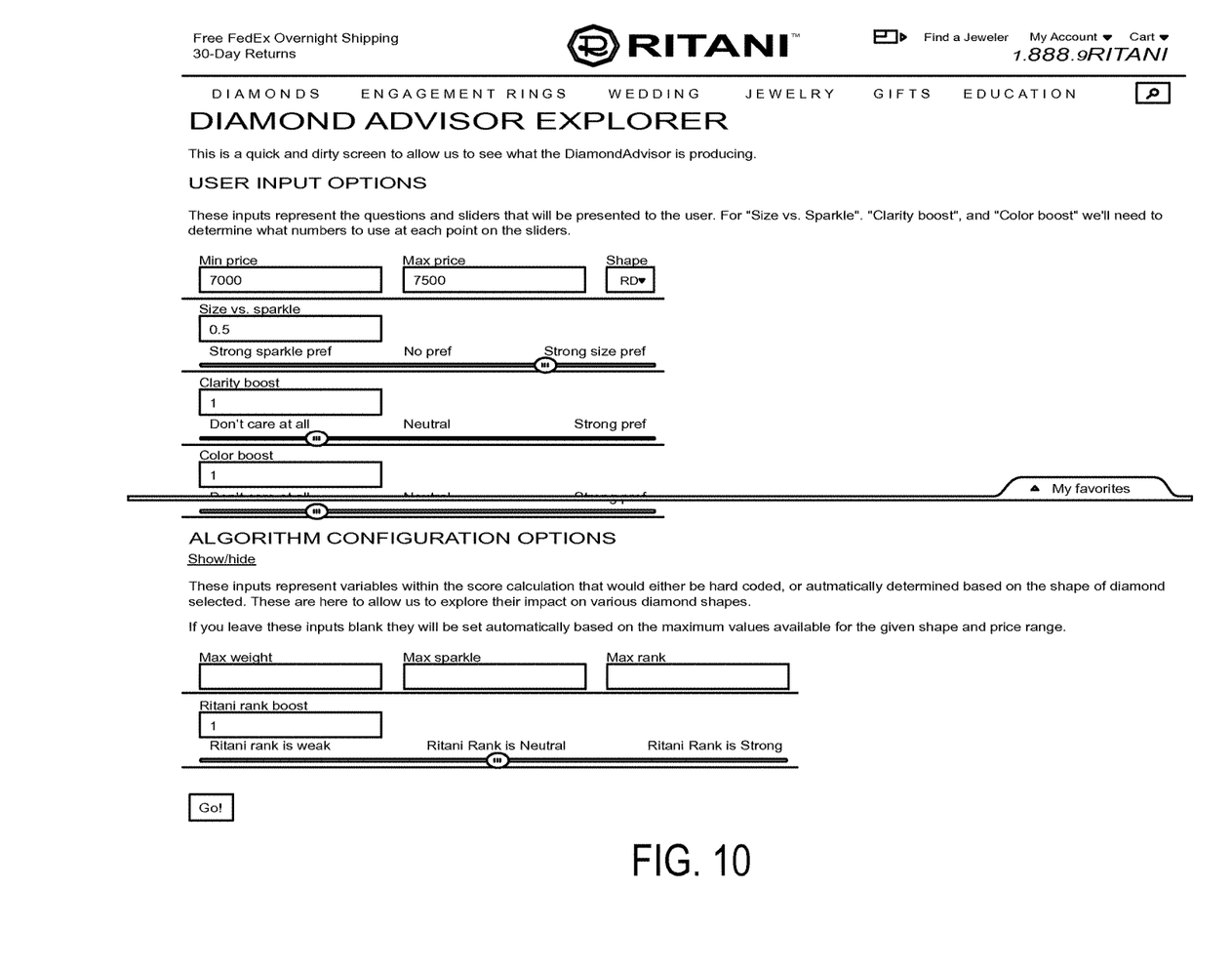
FIG. 10 depicts an exemplary interface for inputting user options and algorithm configuration options relating to the selection of a product in accordance with an aspect of the invention.

FIG. 10 depicts an exemplary interface for inputting user options and algorithm configuration options relating to the selection of a product in accordance with an aspect of the invention. In some embodiments, information in the interface of FIG. 10 may represent or otherwise correspond to information input via one or more other interfaces, such as the interface of FIGS. 2 and 5. For example, the "user input options" in the top half of FIG. 10 may represent information input by the user, e.g., via FIGS. 2 and 5. For example, a user input in FIG. 2 of a total budget of "about" "$7250" may translate to a minimum price of $7000 and a maximum price of $7500 for purposes of recommending products that fit the user-specified budget criteria. A user's preferences (e.g., such as those expressed via sliders in FIG. 5 concerning various product attributes) may be translated into numbers such as those shown in the corresponding fields of FIG. 10. These numbers may be used in an algorithm that identifies recommended products based on the numbers and weights ascribed to different attributes.

In some embodiments, the bottom portion of FIG. 10 may represent recommendation algorithm configuration options. Fields that may be specified (e.g., by a user or system administrator) may include maximum weight, maximum sparkle, maximum rank, rank boost, and weak/neutral/strong rank. A "Go" button may be selected, e.g., to cause the system to use the input criteria to identify (e.g., recommend) one or more products, e.g., that match the criteria.

Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein. For example, features described with reference to diamonds may also apply to other products and items of commerce, such as other jewels, rings, bracelets, necklaces, earrings, jewelry, precious stones, handbags, cars, houses, real estate, or other items.

Additional Embodiments

A. A handheld device for automating a design of an engagement ring, in which the handheld device comprises: a display for displaying: a series of questions to a customer, in which each question is related to the design of the engagement ring; an input device that is capable of receiving at least one answer to the series of questions; a microprocessor; and a memory that stores instructions, which cause the microprocessor to: input the at least one answer into an algorithm; identify on behalf of the customer, based on the algorithm, a plurality of engagement rings that best matches the at least one answer; generate an information box in the display, in response to the selection of a specific engagement ring from the plurality of engagement rings, in which the information box provides a detailed explanation as to why the specific engagement ring was identified as a best match; receive the customer's feedback on the specific engagement ring; and generating a recommended engagement ring to the customer.

A.1. The handheld device of claim A, in which the questions comprises at least of: a desired budget for the engagement ring. A.2. The handheld device of claim A, in which the questions comprises at least of: a selection of a type of metal for the engagement ring's band; and in which the display displays information regarding the type of metal selected by a majority of customers. A.3. The handheld device of claim A, in which the questions comprises at least of: a selection of a style of the engagement ring; and in which the display displays information regarding the style of engagement ring that is selected by a majority of customers. A.4. The handheld device of claim A, in which the questions comprises at least of: a selection of a diamond shape; and in which the display displays information regarding the diamond shape selected by a majority of customers.

A.5. The handheld device of claim A, in which the questions comprises: a comparison question, in which the customer uses a slider to choose the importance of a first feature over a second feature. A.6. The handheld device of claim A.5, in which the first feature comprises a diamond's sparkle and the second feature comprises the diamond's size. A.7. The handheld device of claim A.5, in which the first feature comprises a diamond's clarity under a microscope and the second feature comprises the diamond's clarity to an unaided eye. A.8. The handheld device of claim A.5, in which the comparison question comprises a selection between a clarity of a diamond. A.9. The handheld device of claim A.5, in which the comparison question comprises a selection between a colorlessness of a diamond. A.10. The handheld device of claim A, in which the display displays at least one diamond engagement rings that best matches the customer's questions. A.11. The handheld device of claim A, in which the questions are simple questions. A.12. The handheld device of claim A, in which the memory further stores instructions, which causes the microprocessor to: receive a request to purchase the recommended engagement ring. A.13. The handheld device of claim A, in which the memory further stores instructions, which cause the microprocessor to: input the customer's feedback into a second algorithm.

B. A device for automating a design of an engagement ring, in which the device comprises: a display for displaying: a series of questions to a customer, in which each question is related to the design of the engagement ring; an input device that is capable of receiving at least one answer to the series of questions; a processor; and a memory that stores instructions, which cause the microprocessor to: input the at least one answer into an algorithm; identify on behalf of the customer, based on the algorithm, a plurality of engagement rings that best matches the at least one answer; generate an information box in the display, in response to the selection of a specific engagement ring from the plurality of engagement rings, in which the information box provides a detailed explanation as to why the specific engagement ring was identified as a best match; receive the customer's feedback on the specific engagement ring; and generating a recommended engagement ring to the customer.

B.1. The device of claim A, in which the questions comprises at least of: a desired budget for the engagement ring. B.2. The device of claim B, in which the questions comprises at least of: a selection of a type of metal for the engagement ring's band; and in which the display displays information regarding the type of metal selected by a majority of customers. B.3. The device of claim B, in which the questions comprises at least of: a selection of a style of the engagement ring; and in which the display displays information regarding the style of engagement ring that is selected by a majority of customers. B.4. The device of claim B, in which the questions comprises at least of: a selection of a diamond shape; and in which the display displays information regarding the diamond shape selected by a majority of customers.

B.5. The device of claim B, in which the questions comprises: a comparison question, in which the customer uses a slider to choose the importance of a first feature over a second feature. B.6. The device of claim B.5, in which the first feature comprises a diamond's sparkle and the second feature comprises the diamond's size. B.7. The device of claim B.5, in which the first feature comprises a diamond's clarity under a microscope and the second feature comprises the diamond's clarity to an unaided eye. B.8. The device of claim B.5, in which the comparison question comprises a selection between a clarity of a diamond. B.9. The device of claim B.5, in which the comparison question comprises a selection between a colorlessness of a diamond. B.10. The device of claim B, in which the display displays at least one diamond engagement rings that best matches the customer's questions. B.11. The device of claim B, in which the questions are simple questions. B.12. The device of claim B, in which the memory further stores instructions, which causes the microprocessor to: receive a request to purchase the recommended engagement ring. B.13. The device of claim B, in which the memory further stores instructions, which cause the microprocessor to: input the customer's feedback into a second algorithm.

C. A method for automating a design of an engagement ring, in which the method comprises: displaying on a display a series of questions to a customer, in which each question is related to the design of the engagement ring; receiving, via an input device, at least one answer to the series of questions; inputting, via a processor, the at least one answer into an algorithm; identifying, via the processor, on behalf of the customer, based on the algorithm, a plurality of engagement rings that best matches the at least one answer; generating an information box in the display, in response to the selection of a specific engagement ring from the plurality of engagement rings, in which the information box provides a detailed explanation as to why the specific engagement ring was identified as a best match; receiving the customer's feedback on the specific engagement ring; and generating a recommended engagement ring to the customer.

C.1. The device of claim C, in which the questions comprises at least of: a desired budget for the engagement ring. C.2. The device of claim C, in which the questions comprises at least of: a selection of a type of metal for the engagement ring's band; and in which the display displays information regarding the type of metal selected by a majority of customers. C.3. The device of claim C, in which the questions comprises at least of: a selection of a style of the engagement ring; and in which the display displays information regarding the style of engagement ring that is selected by a majority of customers. C.4. The device of claim C, in which the questions comprises at least of: a selection of a diamond shape; and in which the display displays information regarding the diamond shape selected by a majority of customers.

C.5. The device of claim C, in which the questions comprises: a comparison question, in which the customer uses a slider to choose the importance of a first feature over a second feature. C.6. The device of claim C.5, in which the first feature comprises a diamond's sparkle and the second feature comprises the diamond's size. C.7. The device of claim C.5, in which the first feature comprises a diamond's clarity under a microscope and the second feature comprises the diamond's clarity to an unaided eye. C.8. The device of claim C.5, in which the comparison question comprises a selection between a clarity of a diamond. C.9. The device of claim C.5, in which the comparison question comprises a selection between a colorlessness of a diamond. C.10. The device of claim C further comprising: displaying at least one diamond engagement rings that best matches the customer's questions. C.11. The device of claim C, in which the questions are simple questions. C.12. The device of claim C further comprising: receiving a request to purchase the recommended engagement ring. C.13. The device of claim C further comprising: inputting the customer's feedback into a second algorithm.

What is claimed is:

1. A handheld device for automating a design of an engagement ring, in which the handheld device comprises:
    a display region of a graphical user interface of a display device for displaying:
        a series of user interactive graphical slider objects to provide a series of questions to a customer, in which each question is related to the design of the engagement ring;
    an input device associated with an input region of the graphical user interface that is capable of receiving, from the series of user interactive graphical slider objects, at least one answer to the series of questions;
    a processor; and
    a memory to store instructions, which, when executed, cause the processor to: input, from the series of user interactive graphical slider objects, the at least one answer into an algorithm implemented by a recommendation engine;
        identify on behalf of the customer, based on the algorithm, a plurality of engagement rings that best matches the at least one answer;
        generate an information box on the display region of the graphical user interface of the display device, in response to the selection of a specific engagement ring from the plurality of engagement rings, in which the information box provides a detailed explanation as to why the specific engagement ring was identified as a best match;
        receive, from the input region of the graphical user interface of the input device, customer's feedback on the specific engagement ring;
        generate, on the display region of the graphical user interface of the display device, a first display window with a recommended engagement ring to the customer;
        in response to receipt, from the input region of the graphical user interface of the input device, of customer's feedback indicating the customer is not interested in the recommended engagement ring, generate, on the display region of the graphical user interface of the display device, a second display window, overlaying the first display window, providing interactive graphical objects representing options for the customers to input updated parameters related to characteristics of engagement rings; and
        in response to receipt of the updated parameters related to characteristics of engagement rings, the recommendation engine implemented by the algorithm (1) removes the second display window of the display region of the graphical user interface of the display, (2) generates real time recommendations of other engagement rings based on the updated parameters and (3) displays the recommendations of the other engagement rings on the first display window of the display region of the graphical user interface of the display.

2. The handheld device of claim 1, in which the questions comprises at least of: a desired budget for the engagement ring.

3. The handheld device of claim 1, in which the questions comprises at least of: a selection of a type of metal for the engagement ring's band; and
    in which the display displays information regarding the type of metal selected by a majority of customers.

4. The handheld device of claim 1, in which the questions comprises at least of: a selection of a style of the engagement ring; and
in which the display displays information regarding the style of engagement ring that is selected by a majority of customers.

5. The handheld device of claim 1, in which the questions comprises at least of: a selection of a diamond shape; and
in which the display displays information regarding the diamond shape selected by a majority of customers.

6. The handheld device of claim 1, in which the questions comprises: a comparison question, in which the customer uses a slider to choose the importance of a first feature over a second feature.

7. The handheld device of claim 6, in which the first feature comprises a diamond's sparkle and the second feature comprises the diamond's size.

8. The handheld device of claim 6, in which the first feature comprises a diamond's clarity under a microscope and the second feature comprises the diamond's clarity to an unaided eye.

9. The handheld device of claim 6, in which the comparison question comprises a selection between a clarity of a diamond.

10. The handheld device of claim 6, in which the comparison question comprises a selection between a colorlessness of a diamond.

11. The handheld device of claim 1, in which the display displays at least one diamond engagement ring that best matches the at least one answer.

12. The handheld device of claim 1, in which the memory further stores instructions, which, when executed, cause the processor to:
receive a request to purchase the recommended engagement ring.

13. The handheld device of claim 1, in which the memory further stores instructions, which, when executed, cause the processor to:
Input the customer's feedback into a second algorithm.

14. A device for automating a design of an engagement ring, in which the device comprises:
a display region of a graphical user interface of a display for displaying:
a series of user interactive graphical slider objects to provide a series of questions to a customer, in which each question is related to the design of the engagement ring;
an input device associated with in input region of the graphical user interface that is capable of receiving, from the series of user interactive graphical slider objects, at least one answer to the series of questions;
a processor; and
a memory to stores instructions, which, when executed, cause the processor to:
input, from the series of user interactive graphical slider objects, the at least one answer into an algorithm implemented by a recommendation engine;
identify on behalf of the customer, based on the algorithm, a plurality of engagement rings that best matches the at least one answer;
generate on the display region of the graphical user interface an information box, in response to the selection of a specific engagement ring from the plurality of engagement rings, in which the information box provides a detailed explanation as to why the specific engagement ring was identified as a best match;
receive, from the input region of the graphical user interface, data representing customer's feedback on the specific engagement ring;
generate, on a first display window of the display region of the graphical user interface, data representing a recommended engagement ring to the customer;
in response to receipt, from the input region of the graphical user interface of the input device, of customer's feedback indicating the customer is not interested in the recommended engagement ring, generate, on the display region of the graphical user interface of the display device, a second display window, overlaying the first display window, providing interactive graphical objects representing options for the customers to input updated parameters related to characteristics of engagement rings; and
in response to receipt of the updated parameters related to characteristics of engagement rings, the recommendation engine implemented by the algorithm (1) removes the second display window of the display region of the graphical user interface of the display, (2) generates real time recommendations of other engagement rings based on the updated parameters and (3) displays the recommendations of the other engagement rings on the first display window of the display region of the graphical user interface of the display.

15. A method performed by a processor for automating a design of an engagement ring, in which the method comprises:
generating commands for displaying, on a series of graphical slider objects on a display region of a graphical user interface of display, a series of questions to a customer, in which each question is related to the design of the engagement ring;
receiving, via, the series of a graphical slider objects associated with an input region of the graphical user interface, data representing at least one answer to the series of questions;
inputting, via the processor, from the input region of the graphical user interface, the at least one answer into an algorithm implemented by a recommendation engine;
identifying, via the processor, on behalf of the customer, based on the algorithm, a plurality of engagement rings that best matches the at least one answer;
generating an information box on the display region of the graphical user interface of the display, in response to the selection of a specific engagement ring from the plurality of engagement rings, in which the information box provides a detailed explanation as to why the specific engagement ring was identified as a best match;
receiving, from the input region of the graphical user interface, customer's feedback on the specific engagement ring;
generating, on a first display window of the display region of the graphical user interface, a recommended engagement ring to the customer;
in response to receiving, from the input region of the graphical user interface of the input device, customer's feedback indicating the customer is not interested in the recommended engagement ring, generating, on the display region of the graphical user interface of the display device, a second display window, overlaying the first display window, providing interactive graphical objects representing options for the customers to input updated parameters related to characteristics of engagement rings; and in response to receiving the updated parameters related to characteristics of engagement rings, the recommendation engine implemented by the algorithm (1) removes the second display window of the display region of the graphical user interface of the display, (2) generates real time recommendations of other engagement rings based on the updated parameters, and (3) displays the recommendations of the other engagement rings on the first display window of the display region of the graphical user interface of the display.

\* \* \* \* \*